Sept. 30, 1958      T. F. TURNER      2,854,627
CALORIMETER
Filed Nov. 17, 1954
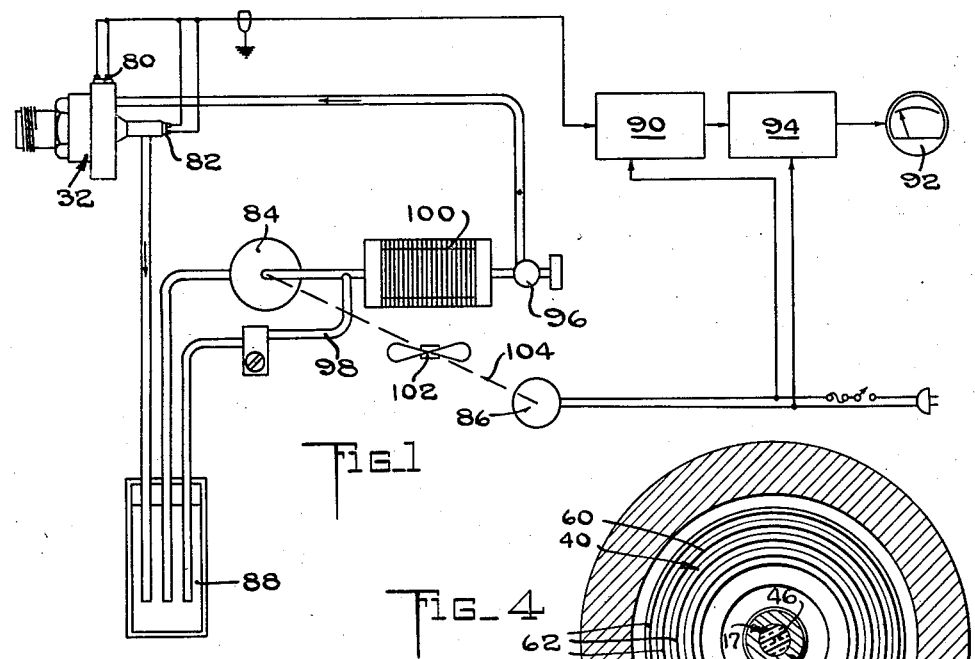
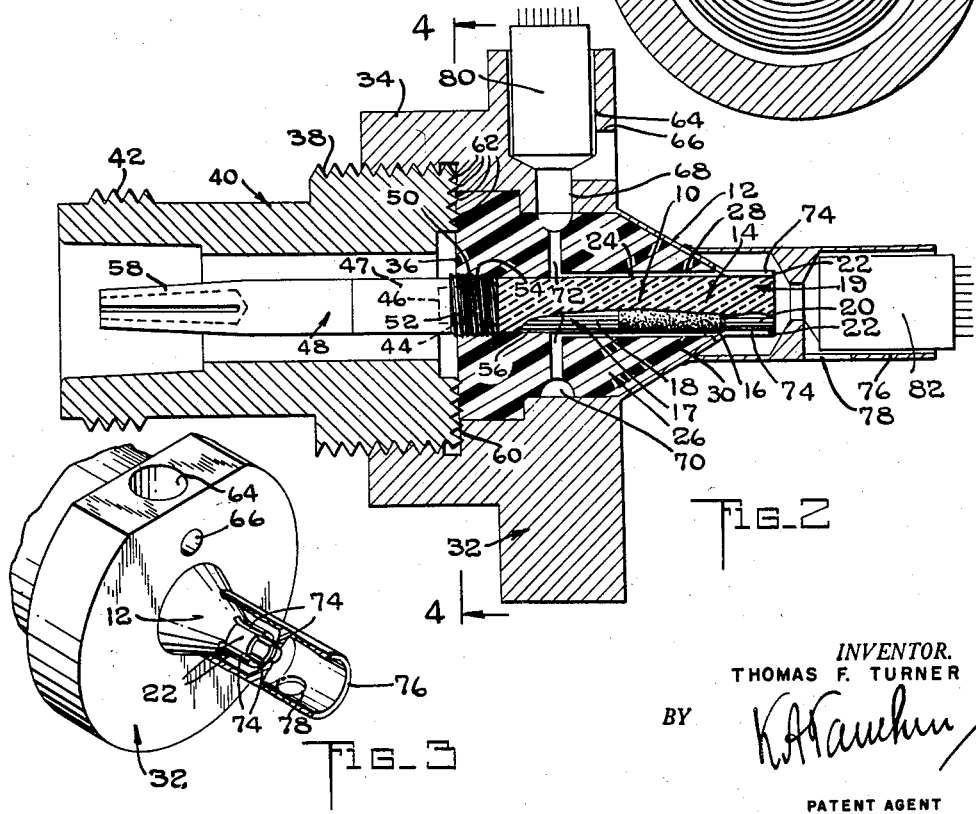
INVENTOR.
THOMAS F. TURNER
BY
PATENT AGENT United States Patent Office 2,854,627
Patented Sept. 30, 1958

2,854,627

CALORIMETER

Thomas F. Turner, Palo Alto, Calif., assignor, by mesne assignments, to Hewlett-Packard Company, Palo Alto, Calif., a corporation of California Application November 17, 1954, Serial No. 469,431

4 Claims. (Cl. 324—95)

The present invention relates to devices for measuring electric power. More particularly the present invention relates to devices, of the type referred to, which are known as calorimeters and which measure electric power by detecting the temperature rise effected by the electric current to be measured in a liquid, and interpreting this temperature rise as a function of dissipated power.

It is an object of my invention to provide a calorimeter whose measuring results remain accurate over a wide frequency range.

More particularly it is an object of my invention to provide a calorimeter whose measuring results remain accurate over a wide frequency range including D. C. and reaching up to and above 10,000 megacycles.

Yet another object of my invention is to provide a calorimeter that is sensitive to very small power inputs, such as a fraction of a milliwatt, and which retains its fundamental measuring accuracy over a wide power range.

Still another object of my invention is to provide a calorimeter that is independent of the wave form of the applied power impulse.

Furthermore, it is an object of the invention to provide a calorimetric power dissipating and measuring unit that combines compactness with dependability of measuring results.

Still another object of the invention is to provide a calorimetric power dissipating and measuring unit that is independent of ambient temperature over a relatively wide temperature range.

These and other objects of the present invention will be apparent from the following description of the accompanying drawings which illustrate a preferred embodiment thereof and wherein:

Figure 1 is a schematic diagram of a radio frequency calorimeter embodying my invention;

Figure 2 is a longitudinal section through the power dissipating unit of the calorimeter illustrated in Figure 1;

Figure 3 is a fragmentary perspective of the rear end of the power dissipating unit illustrated in Figure 2, and Figure 4 is a cross section through said unit taken along line 4—4 of Figure 2 and viewed in the direction of the arrows associated with said line.

In prior known calorimeters the electric power to be measured was usually dissipated directly in a conductive liquid, such as water or brine. The present invention is based upon the realization that the power absorbing characteristics of such liquids vary widely with changes in frequency, ambient temperature and time for which reason the measuring results obtained with such calorimeters prove unreliable and require different interpretations at different frequencies and different temperatures with attendant errors.

In accordance with the present invention I dissipate the electric power to be measured in a solid resistor of constant impedance and I pass a stream of a low-loss dielectric liquid over said resistor and measure the temperature increase of the liquid across the resistor. I have found that the measuring results thus obtained remain accurate over a wide range of frequencies including D. C., that the described method is sensitive to such small power inputs as a fraction of a milliwatt, and that a device embodying the principles of my invention may readily be constructed in such a manner that it is not adversely affected by variations in the ambient temperature.

The calorimetric power dissipating and measuring unit illustrated in Figure 2 is designed for use in connection with coaxial lines and comprises essentially a load resistor 10 one end of which may be connected to the center conductor of the coaxial line that carries the electric power to be measured, by connector elements of high electric, yet low thermal conductivity to be described in greater detail hereinafter. Its opposite end may be connected to the outer conductor of said coaxial line by a hollow metal taper 12 which surrounds, and extends over the full length of, said resistor 10 and is preferably made of silver plated brass.

The load resistor 10 is formed by a cylindrical core 14 of an electrically non-conductive material of low thermal conductivity, such as glass, whose outer cylindrical surface is enveloped in an extremely thin film 16 of an electrically conductive material of high ohmic resistance, such as the material known as Corning Electrically Conductive Glass.

To provide for electrically conductive connection of the load resistor 10 with the center conductor of a coaxial line, the glass core 14 is extended in a direction away from taper 12 as shown at 17, and carries adjacent to, and in conductive relation with the conductive glass film 16, an extremely thin cylindrical film 18 of a material that combines high electrical conductivity with poor thermal conductivity such as a coat of fired silver. The opposite end of glass rod 14 is likewise extended to project a limited distance beyond the truncated end of brass taper 12 as shown at 19, and this projection 19 is also provided with an extremely thin coat 20 of fired silver which is conductvely engaged by spring fingers 22 that project forwardly from the circular edge of the truncated cone 12 at angularly spaced points thereof (Figure 3).

To form a narrow tubular passage 24 around the load resistor 10 for the flow of a dielectric liquid therethrough, a body 26 of a low-loss dielectric material of poor heat conductivity, such as the material known under the trade name Teflon, is arranged to surround the resistor 10 and the silver covered extension 17 of the glass rod 14 with a center bore 28 (Figure 2) that is of slightly larger diameter than the external diameter of said resistor and said silver plated rod extension. The dielectric body 26 is designed to form a conically converging end portion 30 that fits into and fills the space between the taper 12 and the resistor 10 except for the above mentioned tubular passage 24, to inhibit exchange of heat between the stream of liquid passing through passage 24 and the outside atmosphere.

For establishing conductive connection between the brass taper 12 and the outer conductor of a coaxial line, said taper may form part and project forwardly from an annular brass body 32 that surrounds the dielectric body 26, and which forms on the side opposite to taper 12 an inwardly threaded collar 34 that projects beyond the flat rear end 36 of the dielectric body 26, and within which is threadably received the outwardly threaded end 38 of a thick-wall connector tube 40 of brass or the like. The free opposite end of said tube 40 is provided with external threads 42 by means of which it may be connected to the outer conductor of a coaxial line.

The end of glass rod extension 17 is somewhat tapered to form a tenon 44 that fits tightly into a cavity 46 formed in the end 47 of a cylindrical brass rod 48. The end 47 of said brass rod is somewhat enlarged radially to form a plug 50 and is provided with threads 52 that are engaged by and form a fluid tight seal with corresponding threads 54 provided in the radially contracted end portion 56 of the bore 28 which fits tightly around the terminal portion of the glass rod extension 17. Suitably connected to the outwardly projecting end of said brass rod 48 is a standard connector 58 for the center conductor of coaxial lines.

The illustrated variations in the inner diameter of connector tube 40 and the brass body 32—which elements constitute in fact a portion of the outer conductor of a coaxial line—are required to compensate for the change in the outer diameter of the center conductor of said line introduced by the plug 50, and also for the change in the dielectric medium of the line caused by the necessity of having a solid body of dielectric material in the described unit to form a narrow tubular passage around the load resistor.

The wall thickness of the end 38 of connector tube 40 should preferably be such that its end face 60 extends a substantial distance in radial direction at either side of the interface of the annular brass body 32 and the dielectric body 26, and said end face 60 should be provided with a plurality of sharp edged concentrically arranged circular ridges 62, as shown in Figure 4 and as indicated in an exaggerated manner in Figure 2, so that on tightening tube 40 within the collar 34 these ridges bite into the end faces of annular brass body 32 and dielectric body 26 which insures good electrically conductive connection between the tube 40 and the annular body 32 and establishes a dependably fluid tight seal with the end faces of both the brass body 32 and the dielectric body 26.

Means are provided to conduct a stream of dielectric liquid, such as silicone oil, through the narrow tubular passage 24 between the load resistor 10 and the wall of bore 28 in dielectric body 26. To this end the annular brass body 32 forms a socket 64 that has an input aperture 66 near its bottom end and which communicates through a short passage 68 with an annular groove 70 formed in and around the dielectric body 26. Said annular groove in turn communicates through a plurality of radially extending channels 72 with the center bore 28 at a point opposite the silver film 18 on glass rod extension 17 and ahead of the load resistor 10. The dielectric liquid introduced into the tubular passage 24 through aperture 66 in socket 64, and the described sequence of passages flows in an extremely thin tubular film over the load resistor 10 to escape through slots 74 formed between the spring fingers 22 into another socket 76 that is supported from the truncated brass taper 12 adjacent to the silver covered outwardly projecting end 19 of glass rod 14, and which has a lateral discharge opening 78 (Figure 2). Received within the sockets 64 and 76 are appropriately connected thermopiles 80 and 82, respectively, that generate an electric current whenever a difference develops in the temperature of the dielectric liquid passing through said sockets.

In practical performance a continuously operating pump 84 actuated by a motor 86, drives an endless stream of dielectric oil from a suitable reservoir 88 through the described unit from socket 64 to socket 76 to return it to the reservoir 88 as shown in Figure 1. When the conductors of a coaxial line are connected to the described unit through tube 40 and connector prong 58, the power dissipated in the load resistor 10 heats said resistor, and the resistor in turn transmits its heat to the dielectric oil that passes over it. The operator then matches the D. C. output that is generated by the thermo-piles 80 and 82 against an electric current of known magnitude by manipulating the potentiometer 90 until an indicator dial 92, connected to said potentiometer through a suitable amplifier 94, registers "0." By proper calibration the setting of the potentiometer that adjusts the dial 92 to "0," may be made to indicate directly the power flow in the coaxial conductor.

To allow adjustment of the flow rate of the dielectric oil through the energy dissipating unit of my invention, the described hydraulic system may include an adjustable flow control valve 96 and a by-pass line 98 that is arranged to return any excess of the output of pump 84 directly to the reservoir 88. To cool the dielectric liquid after its passage through the energy dissipating unit of my invention, said hydraulic system may also include a radiator 100 that is cooled by a fan 102 which may be driven from the same motor 86 that drives the pump 84 as indicated in Figure 1 by line 104.

I have found that owing to the presence of two dielectric materials of different dielectric constants between the conductors of the coaxial line—as formed on the one side by annular brass body 32 and brass taper 12, and on the other side by load resistor 10 and the silver coats 18 and 20, respectively—namely, the dielectric material of body 26, and the dielectric liquid that is passed through the tubular passage 24, the converging end of the outer tubular conductor as represented by brass taper 12, should be formed in the manner of a straight-walled cone rather than an exponential taper, to render the load resistor 26 within its confines truly frequency independent.

The measuring result obtained with the power dissipating unit of my invention are accurate irrespective of changes in frequency, and irrespective of wide differences in the input power, and a calorimeter embodying the power dissipating unit of my invention provides accurate readings of a wide range of frequencies including D. C. and reaching up to 10,000 megacycles. The constancy of input impedance of the calorimetric power dissipating unit of the invention is indicated by the fact that in a practical embodiment thereof the input voltage standing wave ratio is less than 1.10, or expressed in different terms: the reflection coefficient is less than .05, from D. C. to 10,000 megacycles. Furthermore, due to the narrowness of the tubular passage 24 around the load resistor 10, the flow of dielectric oil over and in contact with said load resistor, is turbulent, and hence the liquid will quickly and uniformly absorb any temperature increase of said load resistor. Also due to the insulation of the load resistor and of the oil stream from the outside atmosphere, as afforded by the trunco-conical end 30 of the dielectric body 26 between said resistor and the brass taper 12, and by the silver plated extension 17 of the glass rod 14, any exchange of heat between said oil stream and the outside atmosphere is held at a negligible minimum. As a result thereof the device of the invention is extremely sensitive and independent of ambient temperature over a substantial temperature range.

While I have explained my invention with the aid of an exemplary embodiment thereof, it will be understood that the invention is not limited to the specific constructional details illustrated and described which may be departed from without departing from the scope and spirit of my invention.

I claim:

1. In microwave calorimetric energy dissipating apparatus, an energy dissipating resistor, a hollow tapered outer conductor surrounding said resistor, the smaller end of the tapered conductor being electrically connected to the adjacent end of the resistor, means for applying microwave energy to the outer end of said resistor, a body of solid dielectric material having a tapered end projecting into the space between the tapered conductor and the energy dissipating resistor and serving to form a thin annular passage adjacent said resistor whereby a turbulent stream of heat absorbing dielectric fluid is passed in intimate contact with the outer surface of the resistor and for the length thereof to rapidly and uniformly absorb heat therefrom, and means for indicating the power absorbed by the fluid from the resistor.

2. A calorimetric measuring unit comprising a tubular resistor, means for connecting the conductors of a coaxial line to the opposite ends of said resistor including a hollow metal taper surrounding and extending over the full length of said resistor, a body of a solid dielectric material disposed within the space between the inner face of said taper and the outer face of said resistor in such a manner as to form a thin tubular passage with said outer face, means operable to pass a stream of dielectric liquid through said tubular passage whereby a turbulent stream of dielectric liquid is formed in intimate contact with the tubular resistor, said turbulent liquid serving to rapidly and uniformly absorb the heat from said resistor, and means for sensing temperature changes in said liquid across said resistor.

3. A calorimetric energy dissipating and measuring unit for use in connection with coaxial lines comprising a tubular resistor, means of low heat conductivity in electrically conductive connection with said resistor for connecting one end thereof to the center conductor of a coaxial line, means including a hollow metal taper electrically conductively connected to the other end of said resistor and extending around said resistor over the full length thereof for connecting said other end to the external conductor of a coaxial line, a body of solid dielectric material having a tapered end projecting into the space between said metal taper and the outer surface of said resistor and forming a narrow tubular passage with said outer surface, means including a passage extending through said dielectric body in a radial direction for introducing a stream of a dielectric liquid into said tubular passage and passing it through said tubular passage in intimate contact with said resistor, said tubular passage causing a turbulent flow of the dielectric liquid past the resistor whereby a turbulent stream of dielectric liquid is formed in intimate contact with the tubular resistor, and means for sensing temperature changes in said dielectric liquid across said resistor.

4. A calorimetric power dissipating and measuring unit for use with coaxial lines comprising an elongated cylindrical rod of dielectric material having a coating of electrically conductive material to form a resistor, means for conductively connecting one end of said resistor to the outer conductor of a coaxial line including a hollow metal taper in electrically conductive connection with said resistor and extending coaxially over the full length thereof, an annular metal body in electrically conductive connection with the wide end of said metal taper and forming an internally threaded collar at the side opposite to said metal taper, means for electrically connecting the other end of said resistor to the center conductor of a coaxial line including a metal rod coaxial and in electrically conductive connection with the opposite end of said resistor, means for guiding a thin tubular turbulent stream of a dielectric liquid over said resistor including an annular body of solid dielectric material disposed within said annular metal body and projecting into said hollow taper, said dielectric body being arranged to surround said resistor in such a manner as to form a thin tubular passage therewith and having an external annular groove and a number of channels extending from said groove radially to said tubular passage at points ahead of said resistor, said metal rod being arranged to form a plug closing the end of said tubular passage opposite to said metal taper, said turbulent liquid serving to rapidly and uniformly absorb the heat from said resistor, and means for indicating the power absorbed by the liquid from the resistor.

References Cited in the file of this patent

UNITED STATES PATENTS

| | | |
|---|---|---|
| 2,066,480 | McKerrall | Jan. 5, 1937 |
| 2,453,283 | Tiley | Nov. 9, 1948 |
| 2,463,428 | Rieke | Mar. 1, 1949 |
| 2,497,093 | Moreno | Feb. 14, 1950 |
| 2,549,687 | Jack et al. | Apr. 17, 1951 |
| 2,560,536 | Althouse | July 17, 1951 |
| 2,702,368 | Bird | Feb. 15, 1955 |